Jan. 2, 1934.  W. SALCHOW  1,941,624
PHOTOGRAPHIC APPARATUS
Filed Sept. 22, 1931  4 Sheets-Sheet 1
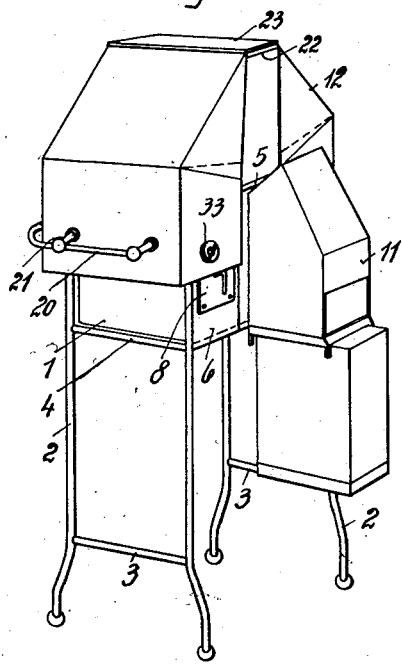
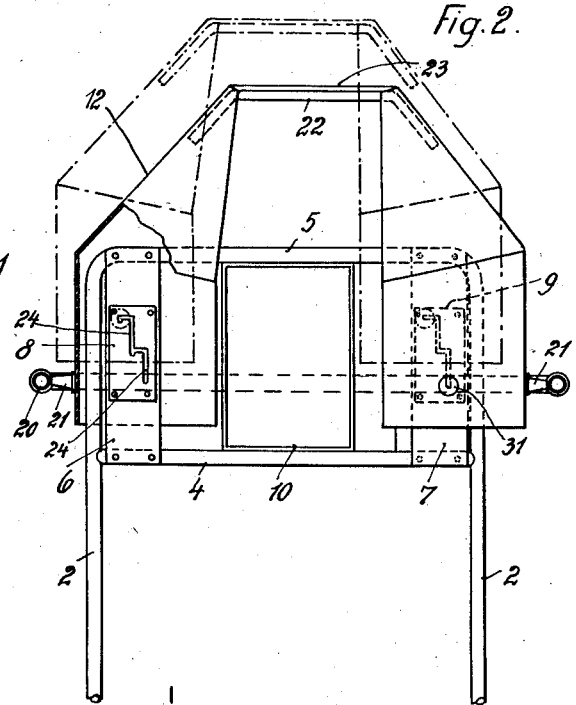
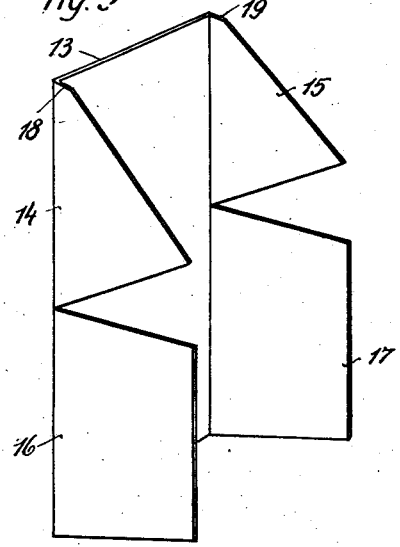
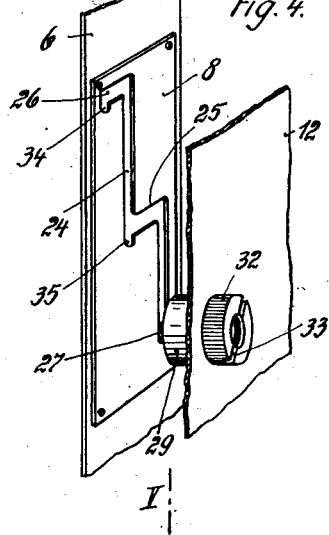
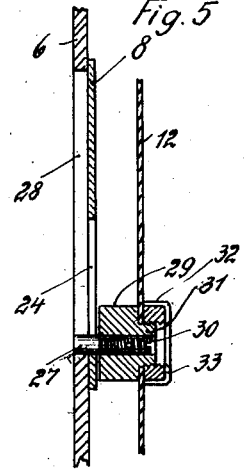
Inventor:
Willy Salchow
By Karl Weinhauer
Atty.

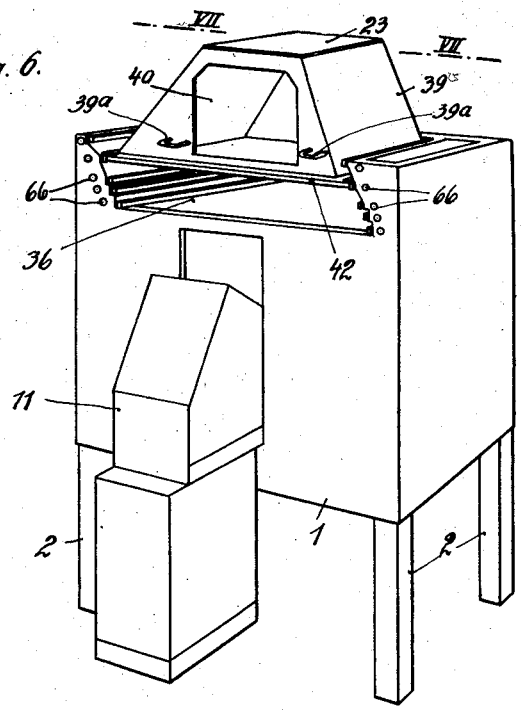
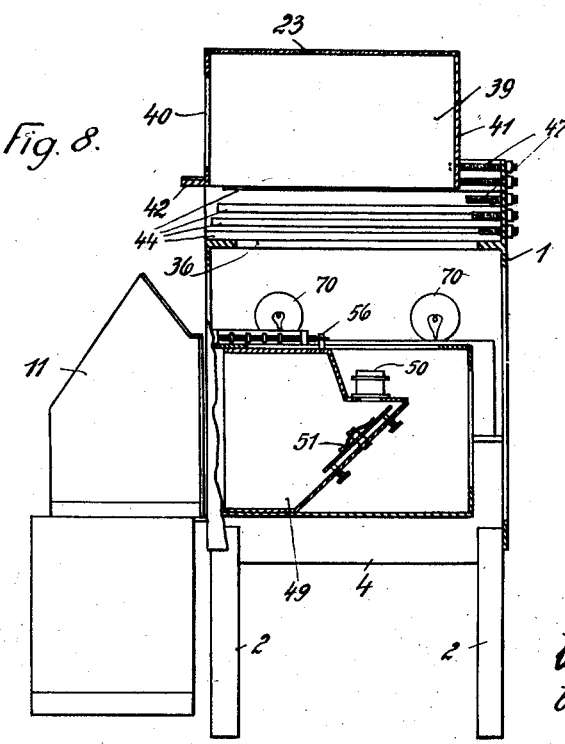

Jan. 2, 1934.   W. SALCHOW   1,941,624
PHOTOGRAPHIC APPARATUS
Filed Sept. 22, 1931    4 Sheets-Sheet 3
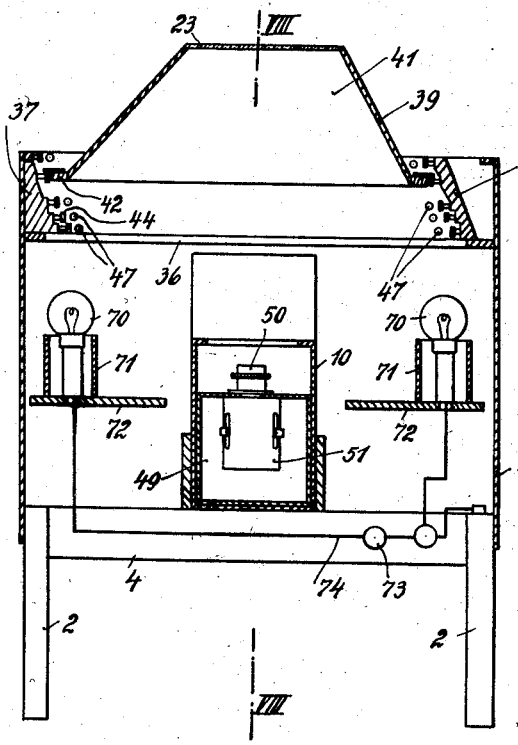
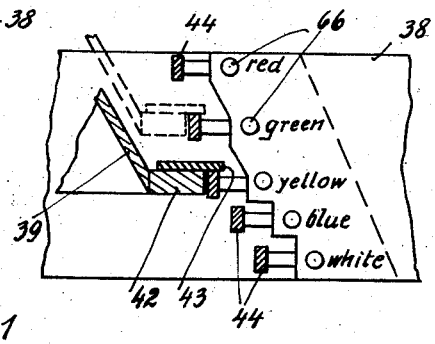
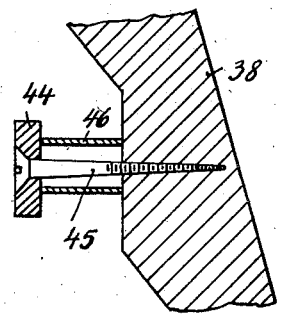
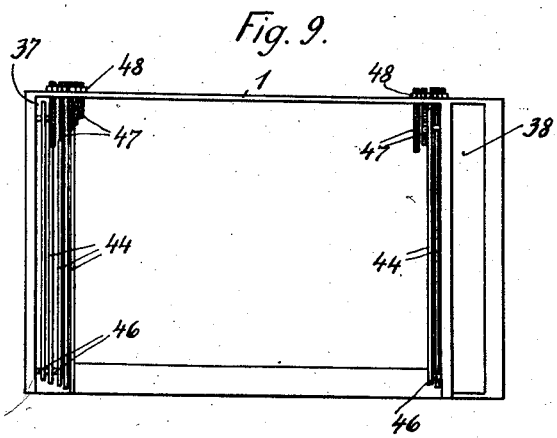
Inventor:
Willy Salchow
by [signature]
Atty.

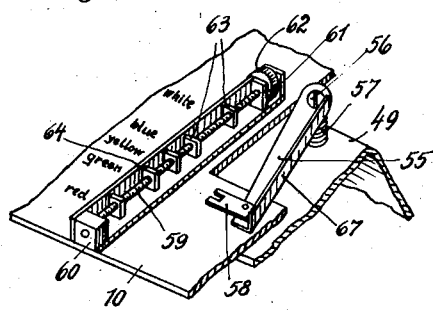
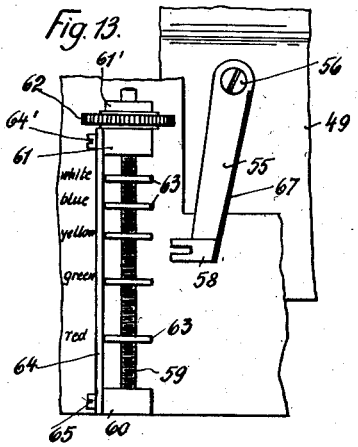
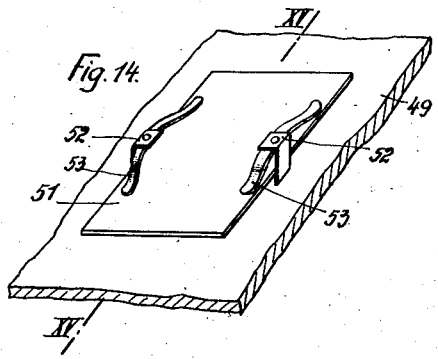
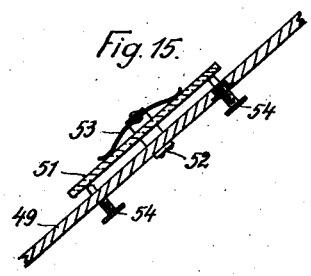
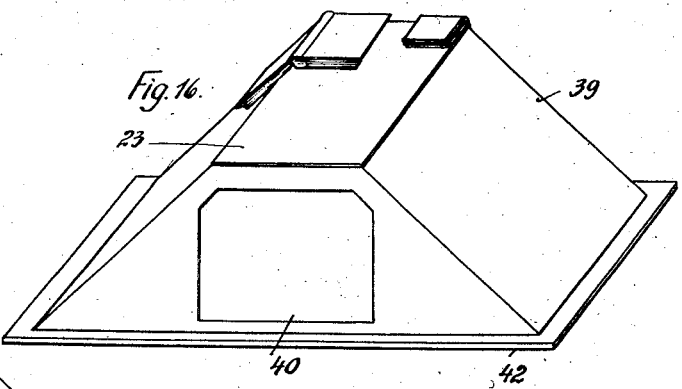
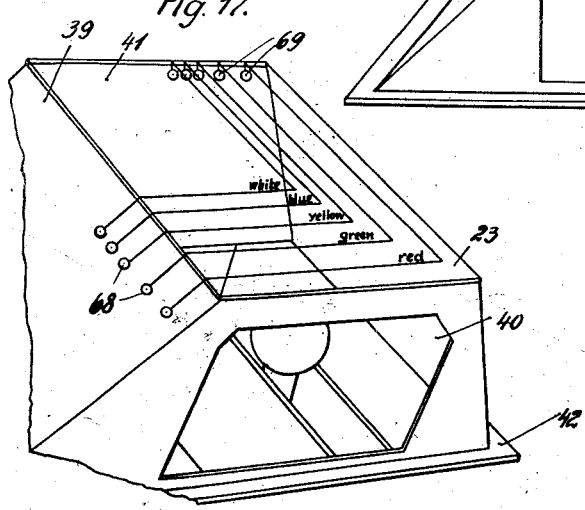

Patented Jan. 2, 1934

1,941,624

UNITED STATES PATENT OFFICE 1,941,624

PHOTOGRAPHIC APPARATUS

Willy Salchow, Berlin-Tempelhof, Germany

Application September 22, 1931, Serial No. 564,363, and in Germany October 17, 1930

8 Claims. (Cl. 88—24)

My invention relates to photographic apparatus, and more particularly to apparatus for photographing, what is known as "copy", i. e., letters, documents, maps, book pages, and the like.

It is an object of my invention to improve an apparatus of this type with a view to increasing its adaptability.

To this end I so design the holder on which the copy is supported that it may be displaced along straight lines in horizontal and vertical direction.

It is another object of my invention to provide means for facilitating the adjustment of the camera as required by the alterations in the position of the copy holder. To this end I provide marks on the apparatus each of which corresponds to a definite position of the copy holder, and similar marks at the adjusting device.

It has already been proposed to provide cranks or rocking arms for displacing the copy holder. Cranks or rocking arms, in short, members for circular movement, have the drawback that the copy holder is displaced horizontally as well as vertically, i. e., a definite horizontal position corresponds to a definite vertical position of the copy holder. As a rule, however, these two positions are not related as required by the condition that the position of the area for a given copy on the copy holder must correspond to the position of the image in the magazine. This condition obviously will be fulfilled under quite exceptional circumstances only if the horizontal and vertical positions of the copy holder are positively related by cranks or rocking arms.

Moreover, considerations of space may render it undesirable to displace the copy holder along a circular curve.

In order to eliminate these difficulties, I dispense altogether with means for positively guiding the copy holder and arrange it so as to be displaced along straight vertical and horizontal lines.

In the drawings affixed to this specification and forming part thereof an apparatus equipped with two types of copy holders embodying my invention is illustrated diagrammatically by way of example.

In the drawings

Fig. 1 is a perspective illustration of the apparatus of the first or "camway" type.

Fig. 2 is an elevation showing the copy holder on a somewhat larger scale, viewed from the right in Fig. 1, Fig. 3 is a perspective illustration showing the building-up of the copy holder, Fig. 4 is a perspective illustration showing one of the camway plates, and the pin which engages in the camway of the plate, Fig. 5 is a section on the line V—V in Fig. 4, Fig. 6 is a perspective illustration of the second or "stepped" type, Fig. 7 is a section on the line VII—VII in Fig. 1, Fig. 8 is a section on the line VIII—VIII in Fig. 7, Fig. 9 is a plan view of the copy holder, Fig. 10 shows one of the "ladders" for the copy holder, Fig. 11 is a section, drawn to a still larger scale and showing the means for holding and adjusting the step bars of the "ladders", Fig. 12 is a perspective illustration showing the focussing device with its marks, Fig. 13 is a plan view of the focussing device, Fig. 14 is a perspective illustration showing a spring attachment for the mirror of the camera, Fig. 15 is a section on the line XV—XV in Fig. 14, Fig. 16 is a perspective illustration showing the positions of books of various sizes on a copy holder, and Fig. 17 is a perspective illustration showing marks on the copy holder which correspond to the marks on the apparatus and on the camera-adjusting means for positioning copy on the glass plate of the copy holder.

Referring now to the drawings, and first to Figs. 1 to 5, showing the first or "camway" type, 1 is the apparatus which is preferably built up on a metal frame having four legs 2, preferably of steel tubes, with suitable braces 3. 4 is a frame or table near the upper ends of the legs on which the camera and its accessories are supported. 5, Fig. 2, is one of the transverse stays connecting the upper ends of each pair of legs, and 6 and 7 are supports for the cam plates 8 and 9 at the front or magazine side of the apparatus. The cam plates 8 and 9 and their supports 6 and 7 are duplicated at the rear of the apparatus. The transverse stays 5, the supports 6 and 7 and the table 4 make up a bracing structure for the upper end of the apparatus, and may be connected by riveting, welding, or in any other suitable manner. 10 is the camera which is inserted between the table 4 and the stays 5, and 11 is the magazine. The camera and the magazine will not be described in detail in connection with this type as they form no part of the invention.

12 is the copy holder which is shaped like a hood and is open at the bottom so that it may be placed on the apparatus in the manner shown in Fig. 2. The hood is built up from two symmetrical pieces of sheet metal which are welded from blanks as illustrated in Fig. 3. Each blank has a body 13 with two substantially triangular flanges 14 and 15 at its upper and two substantially quadrilateral flanges 16 and 17 at its lower end. The flanges 14 and 15 are beveled at their upper ends 18 and 19 for a purpose which will be explained below. The flanges 14 and 16, and 15 and 17 are overlapped at their inner ends as indicated by the dotted lines in Fig. 1, so that the sides of the hood are partly vertical and partly roof-shaped. 20 is a horse-shoe shaped hand rail which extends along the two sides and along the rear end of the parallel portion of the holder, and 21 are holders by which the hand rail is secured to the copy holder. In this manner the lower or parallel portion of the copy holder is effectively braced. Its upper or roof-shaped portion is braced by two yokes the front one of which is shown at 22 in Figs. 1 and 2. The rear yoke is exactly similar. 23 is a glass plate which is inserted in the opening of the roof-shaped upper portion of the copy holder, and is supported by the yokes, its beveled sides engaging the beveled portions 18 and 19 at the upper end of the copy holder.

The copy holder is shown in its lower final position from which it may be displaced into an intermediate position and into its upper final position as shown in dot-and-dash lines in Fig. 2. The camways 24 in the cam plates 8 and 9 are similar, with two vertical reaches, an intermediate horizontal reach 25, and an upper horizontal reach 26. A pin is secured at both sides of the front and rear walls of the hood 12 for cooperation with one of the cam plates. One of the four pins is illustrated in Fig. 5, 27 being the pin the plain end of which engages in the cam plate 8 and projects into a recess 28 in the support 6 of the cam plate. 29 is a threaded sleeve for the reception of the threaded rear end of the pin 27 and 30 is a locking pin by which the pin 27 is held in position. The sleeve 29 is shouldered and has a threaded portion 31 projecting from the wall of the hood 12, and 32 is a nut with a notch 33 which fits on the threaded outer end of the sleeve 29. Four pins 27 are provided. In order to hold the hood securely in the position imparted to it, two of the camways 24 are provided with seats for the corresponding pin at the inner ends of their horizontal reaches as shown for the cam plate 8 at 34 and 35 in Fig. 4. The camways in the other two plates are plain. The arrangement is such that cam plates having seats 34 and 35 are arranged alternately at the front and at the rear end of the hood as will appear from Fig. 2. In this figure the camway in the plate 8 at the left has the seats 34 and 35 while the cam plate 9 at the right has a plain camway. At the rear of the hood the plate having the seats in its camway is at the right and the plate having the plain camway is at the left, viewed from the front of the apparatus.

In operation the copy is placed on the glass plate 23 and preferably weighted. In the case of a book the page to be photographed is placed on the glass plate with the fold of the book on the edge of the plate, and the opposite page of the book resting on the inclined or roof-shaped portion of the hood.

It will appear from Fig. 2, that the longitudinal axis of the glass plate 23 is disaligned from the axis of the camera toward the right but it will also appear that the hood 12 is moved to the left when raised into its intermediate or upper final position, so that in the upper final position the axis of the glass plate coincides with the axis of the camera.

In the apparatus described with reference to Figs. 1 to 5, the copy holder is engaged at both sides. In the apparatus which will now be described with reference to Figs. 6–17, handles on the copy holder may be dispensed with altogether or provided at its front end only.

The apparatus 1, with its legs 2, the frame or table 4 for the camera 10, and the magazine 11, will not be described in detail.

In this apparatus a frame 36 is inserted above the camera 10, and 37 and 38 are "ladders" at opposite sides of the frame for supporting the copy holder 39 which is here designed like a roof, with the glass plate 23 at its flat top. The front and rear end plates of the roof-shaped copy holder are vertical with an opening 40 in the front end plate and a door 41 in the rear end plate.

The copy holder 39 is equipped with a foundation frame 42 at its base on which outwardly projecting strips are secured at its sides. One of the strips is indicated at 43 in Fig. 10.

The two ladders 37 and 38 are stepped as shown for the inverted ladder 38 at the right in Fig. 10. In the present instance each ladder has five vertical steps. 44 are bearing bars, one per step, which are adapted to support the strips 43 at the right and the left of the foundation frame 42. The bars are preferably secured to the steps of the ladder in the manner indicated in Fig. 11 where 45 is a screw (in the present instance, it has been assumed that the ladders are of wood but obviously they may be made of any other suitable material) in a hole of the bar 44, and 46 is a distance tube which surrounds the screw 45 and holds the bars at the proper distance from the ladder. Any other means may be provided for holding the bars 44 at the required distance. The ladder 37 is designed in an exactly similar manner but is upright and not inverted, like the ladder 38.

It will appear that the copy holder 39 which may be equipped with handles 39a, is not only displaced vertically but also horizontally when moved from a pair of bars 44 to another pair, for instance, raised from the third to the fourth bar as shown in Fig. 10. At the same time its position must also be regulated in the fore-and-aft direction. This is effected by two sets of stops 47, 47 in the rear end wall of the apparatus, as shown in Fig. 9, the sets being arranged in the vicinity of the ladders 37 and 38. Means such as nuts 48 may be provided for holding the stops 47 in position. It will appear from Fig. 9 that the front ends of the bars 44 are also stepped by making the bars of various lengths. This facilitates the insertion of the copy holder.

The position of the objective of camera 10 must be adapted to the position of the copy holder 12 or 39. Means for displacing the objective horizontally have been illustrated for the apparatus shown in Figs. 6 to 17. It is preferred to equip the camera with a sliding objective frame instead of the usual bellows which are delicate and favor the accumulation of dust. In Figs. 7 and 8, 49 is the sliding frame, with its vertical objective 50 and a mirror 51 for deflecting the image from the horizontal glass plate 23 to the vertical sensitized paper in the magazine 11. Means for holding and adjusting the mirror 51 on the frame 49 are illustrated in Figs. 14 and 15. 52 are uprights at opposite sides of the mirror, 53 are springs on the uprights which engage the mirror from above, and 54 are set screws for adjusting the mirror.

The means for fixing the sliding frame 49 in a given position are illustrated in Figs. 12 and 13. 55 is a hook which is fulcrumed on the sliding frame 49 at 56, 57 is a spring which tends to rotate the hook 55 in clockwise direction, and 58 is a fork at the free end of the hook. The upper wall of the camera 10 is recessed for the reception of the pivoted end of the hook, its free end with the fork 58 projecting above the wall 10. 59 is a threaded spindle which is mounted to slide in bearings 60, 61 and 61' on the upper wall of the camera. 62 is a knurled hand wheel which is held against axial displacement between the bearings 61 and 61' and engages in the thread of the spindle. 63 are stops on the threaded spindle 59 which are adapted to be engaged by the fork 58 at the free end of the hook 55. Each stop corresponds to one of the positions of the copy holder 39 on the bars 44, and, as there are five bars per ladder in the present instance, there must also be five stops. The stops 63 are squared or flattened at one side, and this side is engaged by a rail 64 which is pivoted at 64' in the bearing 61 and equipped with a fastening screw 65 at the bearing 60. In this manner any undesired displacement of the stops 63 on the spindle 59 is prevented.

In order to facilitate the adjusting of the sliding objective frame 49 each position of the copy holder 39 is marked with a plate or the like 66, the marks having distinctive characteristics, such as different colours, as shown in Fig. 10 where the bar 44 at the top is equipped with a red mark, and the bars below are equipped with green, yellow, blue and white marks. The stops 63 on the spindle 59 are marked with the same colours for corresponding positions of the slide 49.

When the operator has placed the copy holder in a given position, for instance, "yellow" in Fig. 10, he places the hook 55—which is accessible through the opening 40 in the front end wall of the hood—on the yellow stop 63 and the camera is now adjusted for the corresponding position of the copy holder. Preferably the hook 55 is equipped with a vertical rib 67 at one side for facilitating its handling.

Under certain conditions, for instance, if the magazine 11 is exchanged, it may be necessary to vary the position of the spindle 59 with respect to its bearings without, however, altering the position of the stops 63 on the spindle. Shifting of the spindle is effected by rotating the knurled hand wheel 62.

The positions of the areas on the glass plate 23 which correspond to the adjustment of the camera are indicated by corresponding marks 68, Fig. 17, on one of the inclined sides of the holder 39, and 69 on the rear end wall of the holder below the glass plate. The operator must imagine that lines in parallel to the long and the short sides of the glass plate 23 are drawn from the respective marks, and place the copy in the areas defined by such imaginary lines.

Fig. 16 illustrates, by way of example, the position of three books on the glass plate 23. Normally the books are placed at the left side of the glass plate 23, with the fold coinciding with the edge of the glass plate. It often happens, however, that even the smallest area on the glass plate is too large for the copy and the expensive sensitized paper would be wasted. Means are provided in the magazine for presenting only the area of sensitized paper which corresponds to the area of the copy. There is no difficulty about this with postcards and other flat copy but with small books it is necessary to place the fold transversely to the glass plate, and not longitudinally as with the larger books at the sides of the plate. The position of a small book at the rear edge of the holder 39 is shown in Fig. 16.

The illuminating means preferably include two pairs of lamps 70, Fig. 7, at opposite sides of the camera. The lamps are arranged at the top of suitable casings 71 on supports 72 and connected to a switch 73 by wires 74.

The lamps 70 are so positioned with respect to the objective 50 that their images are not reflected into the objective by the glass plate 23.

Obviously I am not limited to the combinations illustrated by way of example. For instance, I might provide the coloured marks and the means for adjusting the sliding objective frame 49 in combination with an apparatus of the type illustrated in Figs. 1 to 5, and the means for securing the mirror 51 may be applied to the camera in both types.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. A photographic apparatus comprising a camera, a copy holder, and means including a camway with horizontal and vertical reaches and depressions in said horizontal reaches, for fixing said holder in various positions with respect to said camera and a pin on said holder adapted to engage in said depressions.

2. A photographic apparatus comprising a camera, a magazine, a copy holder adapted to be displaced along straight lines in horizontal and vertical direction with respect to the area occupied by the image in said magazine, and stepped supporting means for said holder at the sides and adjustable stepped abutments for the rear end of said holder at the rear of the apparatus.

3. A photographic apparatus comprising a camera, a magazine, a copy holder adapted to be displaced along straight lines in horizontal and vertical direction with respect to the area occupied by the image in said magazine, means for adjusting said camera in conformity with the various positions of said holder, an objective frame mounted to slide in said camera, a threaded spindle on said camera, stops on said spindle, means for preventing rotation of said stops, and means on said frame for engaging said stops.

4. A photographic apparatus comprising a camera, a magazine, a copy holder adapted to be displaced along straight lines in horizontal and vertical direction with respect to the area occupied by the image in said magazine, means for adjusting said camera in conformity with the various positions of said holder, an objective frame mounted to slide in said camera, a threaded spindle mounted to be displaced axially on said camera, means for displacing said spindle, stops on said spindle, means for preventing rotation of said stops, and means on said frame for engaging said stops.

5. A photographic apparatus comprising a camera, a magazine, a polygonal copy holder adapted to be displaced horizontally and vertically, and markings defining polygonal figures on said copy holder which correspond to the shape of the holder, two adjacent sides of every figure coinciding with two adjacent sides of the holder.

6. A photographic apparatus comprising a camera, a magazine, a polygonal copy holder adapted to be displaced horizontally and vertically, markings defining polygonal figures on said copy holder which correspond to the shape of the holder, two adjacent sides of every figure coinciding with two adjacent sides of the holder, means for adjusting said camera in conformity with the various positions of said holder, and marks corresponding to the figures on said copy holder for indicating corresponding positions of said holder and said camera-adjusting means.

7. A photographic apparatus comprising a camera, a magazine, a polygonal copy holder adapted to be displaced horizontally and vertically, markings defining polygonal figures on said copy holder which correspond to the shape of the holder, two adjacent sides of every figure coinciding with two adjacent sides of the holder, an objective frame mounted to slide on said camera, marks corresponding to the figures on said copy holder, adjustable stops on said camera, each stop corresponding to one of said marks, and means on said objective frame for engaging said stops in the various positions of said frame.

8. A photographic apparatus comprising a camera, a magazine, a polygonal copy holder adapted to be displaced horizontally and vertically, markings defining polygonal figures on said copy holder which correspond to the shape of the holder, two adjacent sides of every figure coinciding with two adjacent sides of the holder, an objective frame mounted to slide on said camera, a threaded spindle on said camera, marks corresponding to the figures on said copy holder, stops engaging in the thread of said spindle, each stop corresponding to one of said marks, a hook pivoted on said objective frame and adapted to engage said stops, and resilient means tending to force said hook into engagement with said stops.

WILLY SALCHOW.